(12) United States Patent
Jin (10) Patent No.: US 10,654,590 B2
(45) Date of Patent: May 19, 2020

(54) AIRCRAFT COCKPIT VIEW ENHANCING SYSTEM AND METHOD

(71) Applicants: COMMERCIAL AIRCRAFT CORPORATION OF CHINA, LTD., Shanghai (CN); SHANGHAI AIRCRAFT DESIGN AND RESEARCH INSTITUTE OF COMMERICAL AIRCRAFT CORPORATION OF CHINA, Shanghai (CN)

(72) Inventor: Ding Jin, Shanghai (CN)

(73) Assignees: COMMERCIAL AIRCRAFT CORPORATION OF CHINA, LTD., Shanghai (CN); SHANGHAI AIRCRAFT DESIGN AND RESEARCH INSTITUTE OF COMMERCIAL AIRCRAFT CORPORATION OF CHINA, Shanghai (CN)

( * ) Notice: Subject to any disclaimer, the term of this patent is extended or adjusted under 35 U.S.C. 154(b) by 30 days.

(21) Appl. No.: 15/578,136

(22) PCT Filed: Nov. 9, 2016

(86) PCT No.: PCT/CN2016/105141
§ 371 (c)(1),
(2) Date: Nov. 29, 2017

(87) PCT Pub. No.: WO2017/080444
PCT Pub. Date: May 18, 2017

(65) Prior Publication Data
US 2018/0237157 A1 Aug. 23, 2018

(30) Foreign Application Priority Data
Nov. 12, 2015 (CN) .......................... 2015 1 0770666

(51) Int. Cl.
*B64D 47/08* (2006.01)
*G06T 3/00* (2006.01)
(Continued)

(52) U.S. Cl.
CPC ................ *B64D 47/08* (2013.01); *G06T 3/00* (2013.01); *G06T 3/0068* (2013.01); *G06T 7/13* (2017.01);
(Continued)

(58) Field of Classification Search
CPC combination set(s) only.
See application file for complete search history.

(56) References Cited

U.S. PATENT DOCUMENTS

| 7,180,476 B1 | 2/2007 | Guell et al. | |
|---|---|---|---|
| 2004/0156530 A1* | 8/2004 | Brodsky | G06K 9/32 382/103 |

(Continued)

FOREIGN PATENT DOCUMENTS

| CN | 101277432 A | 10/2008 |
|---|---|---|
| CN | 102591014 A | 7/2012 |

(Continued)

OTHER PUBLICATIONS

PCT written opinion dated Feb. 14, 2017 from corresponding International Application No. PCT/CN2016/105141 (4 pages).
(Continued)

*Primary Examiner* — Zhiyu Lu
(74) *Attorney, Agent, or Firm* — Maier & Maier, PLLC (57) ABSTRACT

An aircraft cockpit view enhancement system and method. The aircraft cockpit view enhancement system has: front-position, left-position and right-position camera devices. The front-position camera device is arranged between a driver's eye position point and an aircraft windshield pillar, with a photographing angle directly facing the aircraft
(Continued)

windshield pillar, and the left-position and right-position camera devices are respectively arranged at a left side and a right side of the aircraft windshield pillar, with photographing angles respectively pointing to the right side and the left side deviated from the aircraft windshield pillar. An image processing device for performing image synthesis and image registration on a front-position image, a left-position image and a right-position image photographed by the front-position camera device, the left-position camera device and the right-position camera device, to obtain an image of a region shielded by the aircraft windshield pillar.

4 Claims, 4 Drawing Sheets

(51) Int. Cl.
*G06T 7/30* (2017.01)
*G06T 7/13* (2017.01)
*G09F 9/30* (2006.01)

(52) U.S. Cl.
CPC ............... *G06T 7/30* (2017.01); *G09F 9/301* (2013.01); *B60R 2300/202* (2013.01); *G06T 2207/20221* (2013.01); *G06T 2207/30252* (2013.01)

(56) References Cited

U.S. PATENT DOCUMENTS

| | | | |
|---|---|---|---|
| 2007/0268118 A1 | 11/2007 | Watanabe et al. | |
| 2008/0151054 A1* | 6/2008 | Kubota | B60R 1/00 348/148 |
| 2009/0187300 A1* | 7/2009 | Everitt | G01C 21/3602 701/31.4 |
| 2014/0307091 A1* | 10/2014 | Chang | H04N 7/183 348/148 |
| 2015/0002642 A1 | 1/2015 | Dressler | |
| 2015/0336511 A1* | 11/2015 | Ukeda | B60R 1/00 348/148 |
| 2016/0046290 A1* | 2/2016 | Aharony | G06K 9/00798 701/41 |

FOREIGN PATENT DOCUMENTS

| | | |
|---|---|---|
| CN | 103253196 A | 8/2013 |
| CN | 103581651 A | 2/2014 |
| CN | 103818320 A | 5/2014 |
| CN | 104044745 A | 9/2014 |
| CN | 105405093 A | 3/2016 |
| JP | 2009-078719 A | 4/2009 |

OTHER PUBLICATIONS

Extended European Search Report dated Nov. 19, 2018, in connection with corresponding EP Application No. 16863620.7 (8 pgs.).

* cited by examiner

AIRCRAFT COCKPIT VIEW ENHANCING SYSTEM AND METHOD

The present application claims the priority of Chinese Patent Application No. 201510770666.X, filed on 12 Nov. 2015, the entirety of which is incorporated herein by reference.

FIELD

The present invention relates to an aircraft cockpit view enhancement system and method, which fall within the general technical field of aircrafts.

BACKGROUND

When a civil aircraft cockpit is designed, a cockpit view range requirement in an airworthiness regulation needs to be satisfied. Since the existence of an aircraft windshield pillar necessarily generates local shielding on the view, a supplementary description is proposed in the airworthiness regulation, that is, the head of a driver may move leftwards and rightwards for 32 mm (1.26 inches), to reduce the influence of an obstacle on the field of view as much as possible using a binocular field of view.

Based on the above conditions, the present invention takes installing a cockpit view enhancement system at an inner side of the windshield pillar into consideration, so that a pilot can clearly see the scene shielded by the windshield pillar without moving the head, thereby reducing the burden of the pilot, and improving security. At the same time, the system may also be installed at other required positions of the cockpit, so as to further enhance the view range of the pilot.

At present, the art closest to the present invention is an "invisible cloak" technique presented by the University of Tokyo, Japan in 2004, where the "invisible cloak" is coated with a layer of retroreflection substance and is also equipped with a camera. When in use, the scenario at the rear of the cloak is photographed by the camera, and then an image is converted to a projector at the front of the cloak, and then the image is projected to a dress material made of a special material, so that a wearer may seem as a transparent person. Since the back face of the windshield pillar, i.e. outside the cockpit, is not suitable for a photographing assembly, the technique is not applicable to be used in the scope of the present invention.

SUMMARY

One objective of the present invention is to provide an aircraft cockpit view enhancement system and method, which may precisely display an image of a region shielded by a windshield pillar, and make up for the shortcomings of the fact that the windshield pillar shields a cockpit view.

The above objective of the present invention is implemented by an aircraft cockpit view enhancement system, the aircraft cockpit view enhancement system comprising:

a front-position camera device, a left-position camera device and a right-position camera device, wherein the front-position camera device is arranged between a driver's eye position point and an aircraft windshield pillar, with a photographing angle of the front-position camera device directly facing the aircraft windshield pillar, and the left-position camera device and the right-position camera device are respectively arranged at a left side and a right side of the aircraft windshield pillar, with photographing angles of the left-position camera device and the right-position camera device respectively pointing to the right side and the left side deviated from the aircraft windshield pillar;

an image processing device, the image processing device being connected to the front-position camera device, the left-position camera device and the right-position camera device to perform image synthesis and image registration on a front-position image, a left-position image and a right-position image photographed by the front-position camera device, the left-position camera device and the right-position camera device, so as to obtain an image of a region shielded by the aircraft windshield pillar; and a display device, the display device being connected to the image processing device to display the obtained image of the region shielded by the aircraft windshield pillar.

According to the above technical solution, the aircraft cockpit view enhancement system of the present invention may have the following beneficial technical effect: being able to precisely display an image of a region shielded by a windshield pillar, so as to make up for the shortcomings of the fact that the windshield pillar shields a cockpit view.

Preferably, the image processing device comprises an image synthesis module, an edge detection module and an image registration module, wherein the image synthesis module is used for performing image synthesis on the left-position image and the right-position image so as to obtain a synthesized image with a greater angle of view, the edge detection module is used for performing edge detection on the front-position image so as to obtain a boundary of the region shielded by the aircraft windshield pillar, and the image registration module is used for performing image registration on the obtained synthesized image and front-position image, and extracting an image of the region shielded by the aircraft windshield pillar according to the obtained boundary.

According to the above technical solution, the aircraft cockpit view enhancement system of the present invention may have the following beneficial technical effect: being able to precisely extract an image of a region shielded by an aircraft windshield pillar, so as to further precisely display the image of the region shielded by the windshield pillar.

Preferably, the image processing device further comprises an image cutting module, the image cutting module being used for adjustably cutting the image of the region shielded by the aircraft windshield pillar according to an actual visual effect.

According to the above technical solution, the aircraft cockpit view enhancement system of the present invention may have the following beneficial technical effect: being able to adjustably cut an image of a region shielded by an aircraft windshield pillar according to an actual visual effect, so as to further precisely display the image of the region shielded by the windshield pillar.

Preferably, the image processing device further comprises an image transformation module, the image transformation module being used for performing image transformation processing on the image of the region shielded by the aircraft windshield pillar according to the shape of the aircraft windshield pillar, such that the image of the region shielded by the aircraft windshield pillar which has been subjected to the image transformation processing is suited to the shape of the aircraft windshield pillar.

According to the above technical solution, the aircraft cockpit view enhancement system of the present invention may have the following beneficial technical effect: being able to enable an image of a region shielded by an aircraft windshield pillar to be suited to the shape of the aircraft windshield pillar, so as to further precisely display the image of the region shielded by the windshield pillar.

Preferably, the display device is a flexible thin film display device, and the flexible thin film display device is attached to an inner side of the aircraft windshield pillar.

According to the above technical solution, the aircraft cockpit view enhancement system of the present invention may have the following beneficial technical effect: the flexible thin film display device being able to enable an image of a region shielded by an aircraft windshield pillar to be suited to the shape of the aircraft windshield pillar, so as to further precisely display the image of the region shielded by the windshield pillar.

The above objective of the present invention is further implemented by an aircraft cockpit view enhancement method, the aircraft cockpit view enhancement method comprising:

photographing, by a front-position camera device, a left-position camera device and a right-position camera device respectively, a front-position image, a left-position image and a right-position image, wherein the front-position camera device is arranged between a driver's eye position point and an aircraft windshield pillar, with a photographing angle of the front-position camera device directly facing the aircraft windshield pillar, and the left-position camera device and the right-position camera device are respectively arranged at a left side and a right side of the aircraft windshield pillar, with photographing angles of the left-position camera device and the right-position camera device respectively pointing to the right side and the left side deviated from the aircraft windshield pillar;

performing, by an image processing device, image synthesis and image registration on the front-position image, the left-position image and the right-position image to obtain an image of a region shielded by the aircraft windshield pillar; and displaying, by a display device, the obtained image of the region shielded by the aircraft windshield pillar.

According to the above technical solution, the aircraft cockpit view enhancement method of the present invention may have the following beneficial technical effect: being able to precisely display an image of a region shielded by a windshield pillar, so as to make up for the shortcomings of the fact that the windshield pillar shields a cockpit view.

Preferably, performing, by an image processing device, image synthesis and image registration on the front-position image, the left-position image and the right-position image to obtain an image of a region shielded by the aircraft windshield pillar comprises: performing image synthesis on the left-position image and the right-position image to obtain a synthesized image with a greater angle of view; performing edge detection on the front-position image to obtain a boundary of the region shielded by the aircraft windshield pillar; and performing image registration on the obtained synthesized image and front-position image, and extracting the image of the region shielded by the aircraft windshield pillar according to the obtained boundary.

According to the above technical solution, the aircraft cockpit view enhancement method of the present invention may have the following beneficial technical effect: being able to precisely extract an image of a region shielded by an aircraft windshield pillar, so as to further precisely display the image of the region shielded by the windshield pillar.

Preferably, performing, by an image processing device, image synthesis and image registration on the front-position image, the left-position image and the right-position image to obtain an image of a region shielded by the aircraft windshield pillar further comprises: adjustably cutting the image of the region shielded by the aircraft windshield pillar according to an actual visual effect.

According to the above technical solution, the aircraft cockpit view enhancement method of the present invention may have the following beneficial technical effect: being able to adjustably cut an image of a region shielded by an aircraft windshield pillar according to an actual visual effect, so as to further precisely display the image of the region shielded by the windshield pillar.

Preferably, performing, by an image processing device, image synthesis and image registration on the front-position image, the left-position image and the right-position image to obtain an image of a region shielded by the aircraft windshield pillar further comprises: performing image transformation processing on the image of the region shielded by the aircraft windshield pillar according to the shape of the aircraft windshield pillar, such that the image of the region shielded by the aircraft windshield pillar which has been subjected to the image transformation processing is suited to the shape of the aircraft windshield pillar.

According to the above technical solution, the aircraft cockpit view enhancement method of the present invention may have the following beneficial technical effect: being able to enable an image of a region shielded by an aircraft windshield pillar to be suited to the shape of the aircraft windshield pillar, so as to further precisely display the image of the region shielded by the windshield pillar.

Preferably, the display device is a flexible thin film display device, and the flexible thin film display device is attached to an inner side of the aircraft windshield pillar.

According to the above technical solution, the aircraft cockpit view enhancement method of the present invention may have the following beneficial technical effect: the flexible thin film display device being able to enable an image of a region shielded by an aircraft windshield pillar to be suited to the shape of the aircraft windshield pillar, so as to further precisely display the image of the region shielded by the windshield pillar.

DETAILED DESCRIPTION

The present invention is further described below in conjunction with specific embodiments and drawings. In the following description, more details are explained for the ease of fully understanding the present invention. However, it is obvious for the present invention to be implemented by a plurality of other manner different from this description, and those skilled in the art may make similar generalization and deduction according to practical application conditions without departing from the intention of the present invention. Therefore, the scope of protection of the present invention should not be limited by the contents of the specific embodiments.

Figure 1:
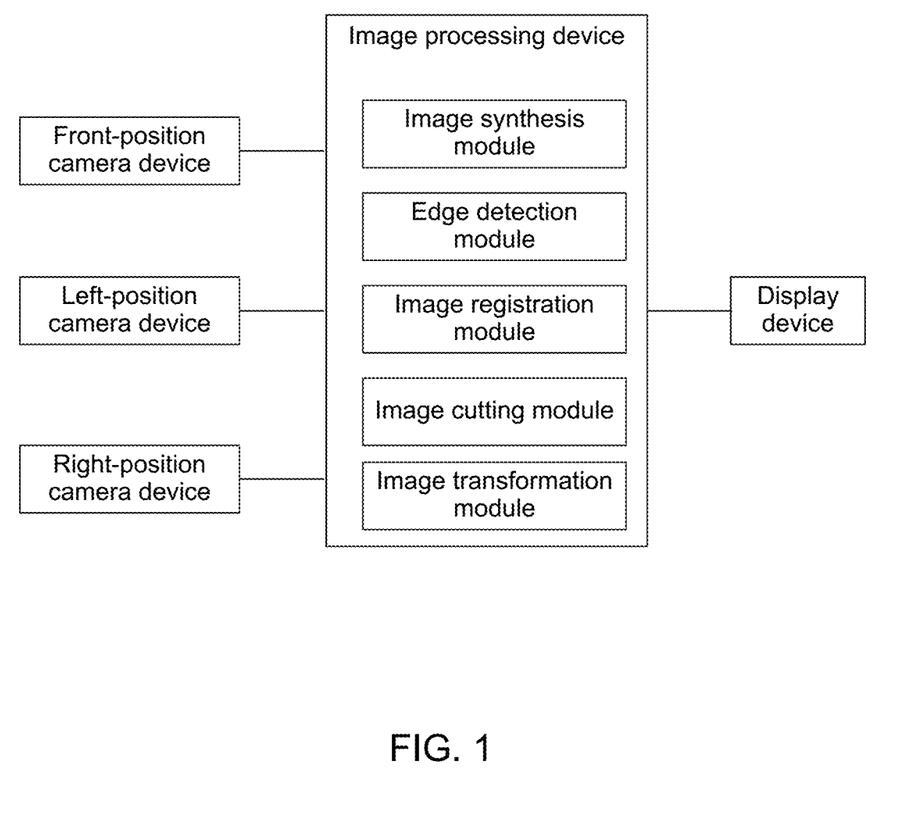
FIG. 1 is a schematic diagram of the composition of an aircraft cockpit view enhancement system of an embodiment of the present invention.

FIG. 1 is a schematic diagram of the composition of an aircraft cockpit view enhancement system of an embodiment of the present invention. As shown in FIG. 1, according to an embodiment of the present invention, an aircraft cockpit view enhancement system comprises:

a front-position camera device, a left-position camera device and a right-position camera device, wherein the front-position camera device is arranged between a driver's eye position point and an aircraft windshield pillar, with a photographing angle of the front-position camera device directly facing the aircraft windshield pillar, and the left-position camera device and the right-position camera device are respectively arranged at a left side and a right side of the aircraft windshield pillar, with photographing angles of the left-position camera device and the right-position camera device respectively pointing to the right side and the left side deviated from the aircraft windshield pillar;

an image processing device, the image processing device being connected to the front-position camera device, the left-position camera device and the right-position camera device to perform image synthesis and image registration on a front-position image, a left-position image and a right-position image photographed by the front-position camera device, the left-position camera device and the right-position camera device, so as to obtain an image of a region shielded by the aircraft windshield pillar; and a display device, the display device being connected to the image processing device to display the obtained image of the region shielded by the aircraft windshield pillar.

Preferably, the image processing device comprises an image synthesis module, an edge detection module and an image registration module, wherein the image synthesis module is used for performing image synthesis on the left-position image and the right-position image, so as to obtain a synthesized image with a greater angle of view. An algorithm used for implementing the function of the module may be a least square method based on grey scale values or other algorithms having the same function. The edge detection module is used for performing edge detection on the front-position image so as to obtain a boundary of the region shielded by the aircraft windshield pillar. An algorithm used for implementing the function of the module may be a canny multi-stage edge detection algorithm or other algorithms having the same function. The image registration module is used for performing image registration on the synthesized image and the front-position image, and extracting the image of the region shielded by the aircraft windshield pillar according to the obtained boundary. An algorithm used for implementing the function of the module may be a sequential similarity detection algorithm (SSDA algorithm) based on grey scale values or other algorithms having the same function.

Preferably, the image processing device further comprises an image cutting module, the image cutting module being used for adjustably cutting the image of the region shielded by the aircraft windshield pillar according to an actual visual effect. An algorithm used for implementing the function of the module may be a Cyrus-Beck polygon window linear cutting algorithm or other algorithms having the same function.

Preferably, the image processing device further comprises an image transformation module, the image transformation module being used for performing image transformation processing on the image of the region shielded by the aircraft windshield pillar according to the shape of the aircraft windshield pillar, such that the image of the region shielded by the aircraft windshield pillar which has been subjected to the image transformation processing is suited to the shape of the aircraft windshield pillar. An algorithm used for implementing the function of the module may be a linear least moving square based image transformation algorithm or other algorithms having the same function.

Preferably, the display device is a flexible thin film display device, and the flexible thin film display device is attached to an inner side of the aircraft windshield pillar.

Figure 2:
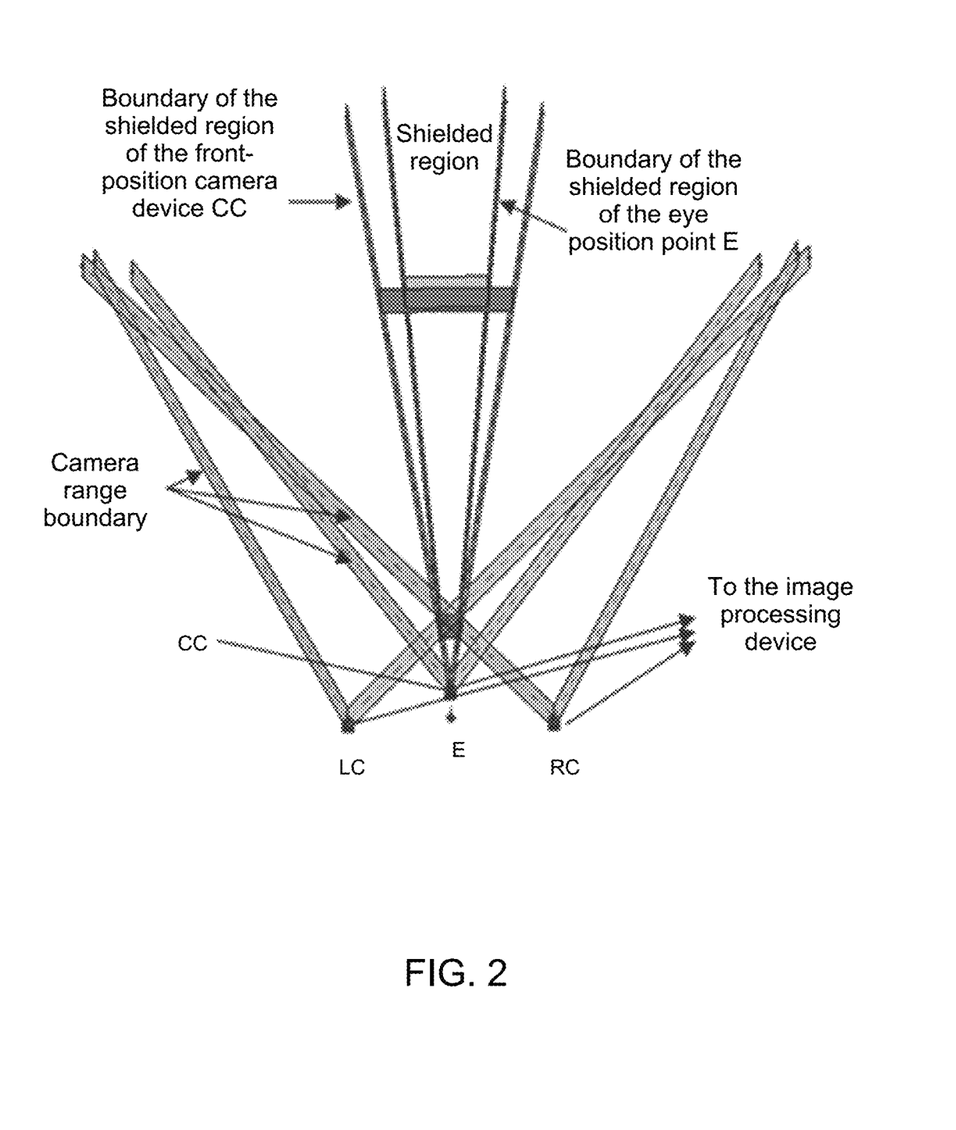
FIG. 2 is a principle diagram of an aircraft cockpit view enhancement system of an embodiment of the present invention.
Figure 3:
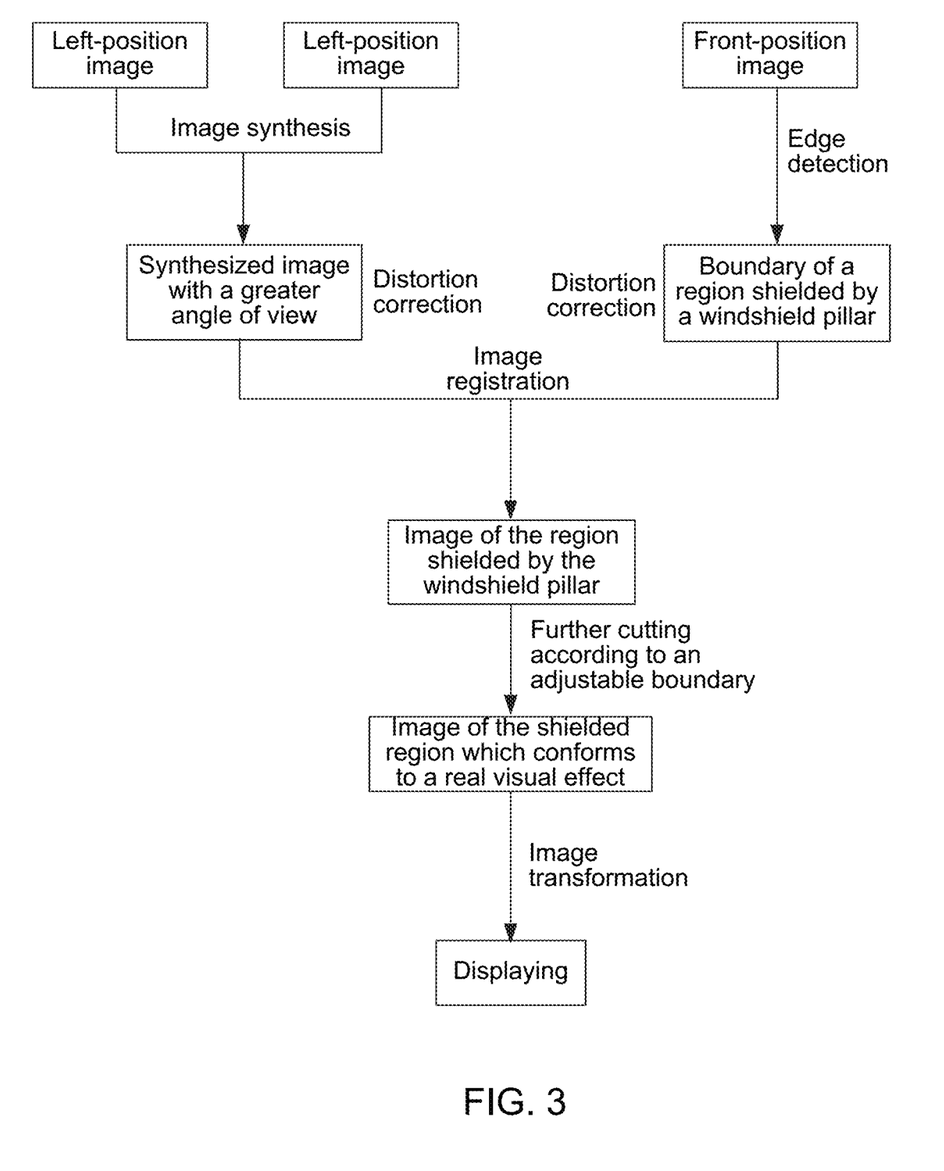
FIG. 3 is an image processing flow chart of an aircraft cockpit view enhancement system of an embodiment of the present invention.
Figure 4:
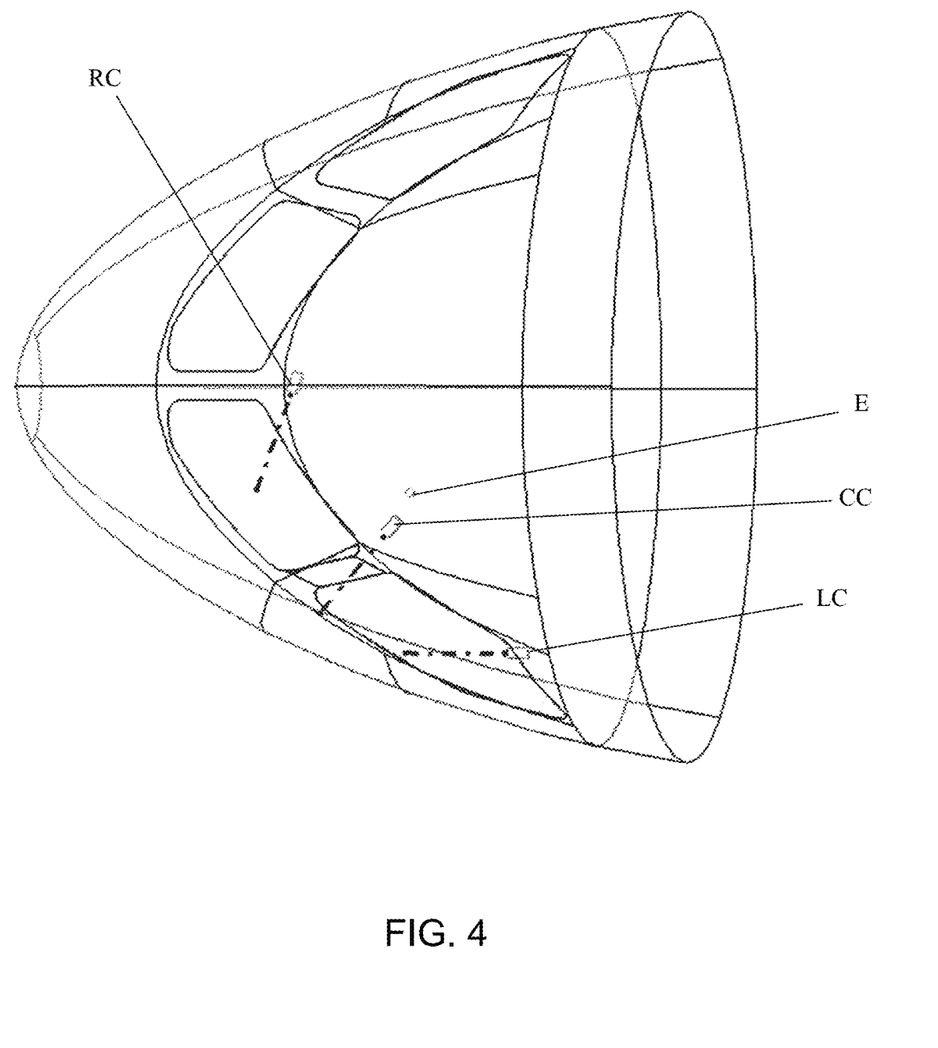
FIG. 4 is a schematic diagram of an aircraft cockpit of an embodiment of the present invention.

FIG. 2 is a principle diagram of an aircraft cockpit view enhancement system of an embodiment of the present invention. FIG. 3 is an image processing flow chart of an aircraft cockpit view enhancement system of an embodiment of the present invention. FIG. 4 is a schematic diagram of an aircraft cockpit of an embodiment of the present invention.

The image processing principle of the aircraft cockpit view enhancement system is described below in conjunction with FIGS. 2-4:

(1) image synthesis is performed on a left-position image photographed by a left-position camera device LC and a right-position image photographed by a right-position camera device RC to obtain a synthesized image with a greater angle of view;

(2) it can be seen from FIG. 2 that, comparing a front-position image photographed by a front-position camera device CC with an image seen from an eye position point E, a shielded region in the front-position image is larger, and thus edge detection is performed on the front-position image to obtain a boundary of the region shielded by a windshield pillar;

(3) image registration are performed on the obtained synthesized image and front-position image, and an image of the region shielded by the windshield pillar is extracted according to the obtained boundary;

(4) preferably, the image of the region shielded by the windshield pillar extracted in the last step is further cut, and the size of the cut boundary may be adjusted by a pilot via an adjustment rotary knob according to an actual visual effect; and (5) preferably, image transformation processing is performed on the image of the region shielded by the windshield pillar according to the shape of the windshield pillar to obtain an image of the region shielded by of the windshield pillar which conforms to a real visual effect so as to be finally displayed on the display device.

As shown in FIG. 3, according to an embodiment of the present invention, an aircraft cockpit view enhancement method comprises:

photographing, by a front-position camera device, a left-position camera device and a right-position camera device respectively, a front-position image, a left-position image and a right-position image, wherein the front-position camera device is arranged between a driver's eye position point and an aircraft windshield pillar, with a photographing angle of the front-position camera device directly facing the aircraft windshield pillar, and the left-position camera device and the right-position camera device are respectively arranged at a left side and a right side of the aircraft windshield pillar, with photographing angles of the left-position camera device and the right-position camera device respectively pointing to the right side and the left side deviated from the aircraft windshield pillar;

performing, by an image processing device, image synthesis and image registration on the front-position image, the left-position image and the right-position image to obtain an image of a region shielded by the aircraft windshield pillar; and displaying, by a display device, the obtained image of the region shielded by the aircraft windshield pillar.

Preferably, performing, by an image processing device, image synthesis and image registration on the front-position image, the left-position image and the right-position image to obtain an image of a region shielded by the aircraft windshield pillar comprises: performing image synthesis on the left-position image and the right-position image to obtain a synthesized image with a greater angle of view; performing edge detection on the front-position image to obtain a boundary of a region shielded by the aircraft windshield pillar; and performing image registration on the obtained synthesized image and front-position image, and extracting the image of the region shielded by the aircraft windshield pillar according to the obtained boundary.

Preferably, performing, by an image processing device, image synthesis and image registration on the front-position image, the left-position image and the right-position image to obtain an image of a region shielded by the aircraft windshield pillar further comprises: adjustably cutting the image of the region shielded by the aircraft windshield pillar according to an actual visual effect.

Preferably, performing, by an image processing device, image synthesis and image registration on the front-position image, the left-position image and the right-position image to obtain an image of a region shielded by the aircraft windshield pillar further comprises: performing image transformation processing on the image of the region shielded by the aircraft windshield pillar according to the shape of the aircraft windshield pillar, such that the image of the region shielded by the aircraft windshield pillar which has been subjected to the image transformation processing is suited to the shape of the aircraft windshield pillar.

As shown in FIG. 4, when the system is practically installed in the cockpit, preferably, the left-position camera device LC and the right-position camera device RC are respectively disposed at two sides of the windshield pillar, and the photographing angles thereof respectively point to one side deviated from the windshield pillar; the front-position camera device CC is installed between an eye position point E and the axis of the windshield pillar, and the photographing angle directly faces the windshield pillar; the three camera devices are respectively fixed on a cockpit wall plate via brackets; a flexible thin film display device is attached to a flat surface of the windshield pillar; an image processing device is installed inside a cockpit panel, and the left-position camera device LC, the right-position camera device RC and the front-position camera device CC and the flexible thin film display device are connected to the image processing device via cables; and appropriate positions are chosen to dispose a power supply switch and an adjustment rotary knob to respectively implement a system switch function and a display range adjustment function (i.e. an adjustable image cutting function).

The specific implementations of the present invention are described above. However, it would be understood by those skilled in the art that the above specific implementations do not constitute the limitations on the present invention, and those skilled in the art may make multiple modifications on the basis of the above disclosure without going beyond the scope of the present invention.

The invention claimed is:

1. An aircraft cockpit view enhancement system, comprising:

a front-position camera device, a left-position camera device and a right-position camera device, wherein the front-position camera device is arranged inside the cockpit between a driver's eye position point and an aircraft windshield pillar, with a photographing angle of the front-position camera device directly facing the aircraft windshield pillar, and the left-position camera device and the right-position camera devices are respectively arranged inside the cockpit at a left side and a right side of the aircraft windshield pillar, with photographing angles of the left-position camera device and the right-position camera device respectively pointing to the right side and the left side deviated from the aircraft windshield pillar;

an image processing device, the image processing device being connected to the front-position camera device, the left-position camera device and the right-position camera device to perform image synthesis and image registration on a front-position image, a left-position image and a right-position image photographed by the front-position camera device, the left-position camera device and the right-position camera device, so as to obtain an image of a region shielded by the aircraft windshield pillar; and a display device, the display device being connected to the image processing device to display the obtained image of the region shielded by the aircraft windshield pillar;

wherein the image processing device comprises an image synthesis module, an edge detection module and an image registration module, wherein the image synthesis module is used for performing image synthesis on the left-position image and the right-position image so as to obtain a synthesized image with a greater angle of view, the edge detection module is used for performing edge detection on the front-position image so as to obtain a boundary of the region shielded by the aircraft windshield pillar, and the image registration module is used for performing image registration on the obtained synthesized image and front-position image, and extracting an image of the region shielded by the aircraft windshield pillar according to the obtained boundary;

wherein the image processing device further comprises an image cutting module, the image cutting module being used for adjustably cutting the image of the region shielded by the aircraft windshield pillar according to an actual visual effect;

wherein the image processing device further comprises an image transformation module, the image transformation module being used for performing image transformation processing on the image of the region shielded by the aircraft windshield pillar according to the shape of the aircraft windshield pillar, such that the image of the region shielded by the aircraft windshield pillar which has been subjected to the image transformation processing is suited to the shape of the aircraft windshield pillar.

2. The aircraft cockpit view enhancement system of claim 1, wherein the display device is a flexible thin film display device, and the flexible thin film display device is attached to an inner side of the aircraft windshield pillar.

3. An aircraft cockpit view enhancement method, comprising:

photographing, by a front-position camera device, a left-position camera device and a right-position camera device respectively, a front-position image, a left-position image and a right-position image, wherein the front-position camera device is arranged inside the cockpit between a driver's eye position point and an aircraft windshield pillar, with a photographing angle of the front-position camera device directly facing the aircraft windshield pillar, and the left-position camera device and the right-position camera device are respectively arranged inside the cockpit at a left side and a right side of the aircraft windshield pillar, with photographing angles of the left-position camera device and the right-position camera device respectively pointing to the right side and the left side deviated from the aircraft windshield pillar;

performing, by an image processing device, image synthesis and image registration on the front-position image, the left-position image and the right-position image to obtain an image of a region shielded by the aircraft windshield pillar; and displaying, by a display device, the obtained image of the region shielded by the aircraft windshield pillar;

wherein performing, by an image processing device, image synthesis and image registration on the front-position image, the left-position image and the right-position image to obtain an image of a region shielded by the aircraft windshield pillar comprises: performing image synthesis on the left-position image and the right-position image to obtain a synthesized image with a greater angle of view; performing edge detection on the front-position image to obtain a boundary of the region shielded by the aircraft windshield pillar; and performing image registration on the obtained synthesized image and front-position image, and extracting the image of the region shielded by the aircraft windshield pillar according to the obtained boundary;

wherein performing, by an image processing device, image synthesis and image registration on the front-position image, the left-position image and the right-position image to obtain an image of a region shielded by the aircraft windshield pillar further comprises: adjustably cutting the image of the region shielded by the aircraft windshield pillar according to an actual visual effect;

wherein performing, by an image processing device, image synthesis and image registration on the front-position image, the left-position image and the right-position image to obtain an image of a region shielded by the aircraft windshield pillar further comprises: performing image transformation processing on the image of the region shielded by the aircraft windshield pillar according to the shape of the aircraft windshield pillar, such that the image of the region shielded by the aircraft windshield pillar which has been subjected to the image transformation processing is suited to the shape of the aircraft windshield pillar.

4. The aircraft cockpit view enhancement method of claim 3, wherein the display device is a flexible thin film display device, and the flexible thin film display device is attached to an inner side of the aircraft windshield pillar.

* * * * *